Patented Sept. 20, 1932

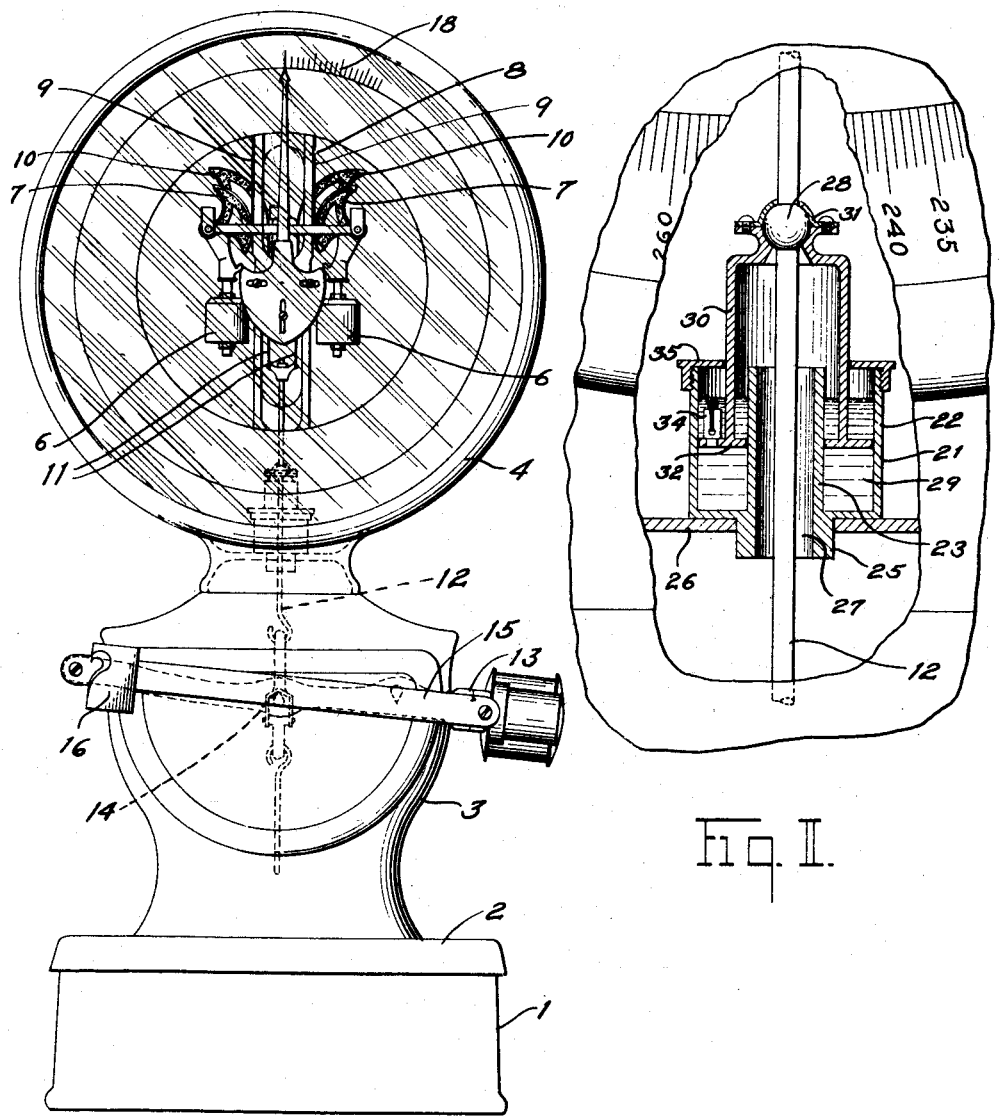

1,878,205

UNITED STATES PATENT OFFICE

EDWARD F. ULRICH, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed April 8, 1925. Serial No. 21,478.

This invention relates to weighing scales, and more particularly to means for sealing openings in scale housings through which movable parts pass.

One of the principal objects of my invention is the provision of a fluid means for sealing openings in a housing through which movable parts pass, for the purpose of excluding dust, acid fumes, moisture and other deleterious substances from the interior of the housing.

Another object is the provision of a fluid means for sealing openings in housings of weighing scales through which movable parts of the weighing mechanism pass and at the same time dampen the oscillations or movements of the weighing scale parts to cause them to come to rest.

Still another object is the provision of a combination dash pot and fluid sealing device which is simple and compact in construction, inexpensive to manufacture, and of a type not liable to get out of order.

Other objects and advantages will be apparent from the following description, in which reference is had to the accompanying drawing illustrating a preferred embodiment of my invention and wherein similar reference numerals designate similar parts throughout the several views.

In the drawing:—

Figure I is a front elevational view of a scale embodying my invention; and

Figure II is an enlarged detail view of a portion of the scale, with parts broken away and parts shown in section.

Referring to the drawing in detail, I have shown my invention as incorporated in a particular type of weighing scale, but it is to be understood that this embodiment is illustrative only and that I contemplate the incorporation of my device in other mechanisms wherever its use may be found desirable.

The weighing scale illustrated comprises a base 1 adapted to house and support lever mechanism (not shown) upon which is mounted a load-receiving platform 2. Erected upon one end of the base 1 is a hollow column 3, and superimposed upon the column is a substantially watch-case-shaped housing 4 adapted to support the load-counterbalancing and indicating mechanism. This mechanism comprises substantially a pair of pendulums 6 provided with fulcrum sectors 7 which are suspended from an upright frame 8 by means of flexible metallic ribbons 9. The pendulums 6 are also provided with a pair of power sectors 10 which are connected by means of flexible metallic ribbons 11 to a steelyard rod 12, the latter being operatively connected to the platform supporting lever mechanism. A supplemental lever 13 is fulcrumed within the column 3 and connected to the steelyard rod 12, as at 14. This lever is provided with a beam 15 equipped with a poise weight 16 for the purpose of increasing the normal capacity of the scale. It will be obvious that if a load be placed upon the platform 2 the steelyard rod 12 and ribbons 11 will be moved downwardly, thus swinging the pendulums 6 outwardly and upwardly to counterbalance the load, the weight of the load being indicated upon a chart 18.

Weighing scales are very often used in places where they are subjected to the deleterious effects of acid fumes, moisture, etc., and a resulting corrosion or rusting of certain parts of the delicate load-counterbalancing and indicating mechanism is liable to set up friction and cause an error in the weight indication. I have provided a simple and effective means for preventing the entrance of fumes into the scale housing and in the same device have constructed an efficient means for damping or retarding the oscillations or movements of the weighing mechanism.

The device of my invention for accomplishing the objects hereinbefore set forth comprises a cup-like receptacle 21 having substantially concentric inner and outer walls 22 and 23, the annular space between these walls being adapted to contain a sealing fluid 29, as, for example, oil or other suitable liquid. The receptacle 21 is provided with a reduced portion 25 which is snugly received into an opening in a web 26 forming an integral part of the watch-case-shaped housing 4 and providing a suitable support for the receptacle. The steelyard rod 12 passes through the tubular opening 27 in the receptacle 21 and is provided with a substantially spherical portion or ball 28 from which is suspended an inverted cup-like member or shield 30 secured to the ball by means of a cap 31. The lower extremity of the member 30 projects into the fluid 29 and is provided with an annular disk or plunger 32 which is adapted to reciprocate in the fluid, whenever actuated by movement of the weighing mechanism, to retard or dampen such movements. A valve 34 fixed to the plunger 32 may be adjusted to control the flow of the liquid through the valve opening and thus regulate the retarding action of the fluid. Sufficient clearance is allowed between the walls of the receptacle and plunger to prevent friction being set up between these parts, and if the steelyard rod 12 is inadvertently moved to an out-of-plumb condition during weighing operations the swivel or ball joint connecting the rod and member 30 is sufficiently free from friction to permit unrestricted movement of the member 30 so that the latter may properly align itself in the dash pot. A cover plate 35 is threaded to the upper part of the dash pot receptacle 21 to prevent the admission of dust and other foreign material from entering the oil and to prevent spilling of the oil during reciprocation of the plunger.

It will be obvious from the foregoing description that in addition to the operation and function of the device as a dash pot or motion dampening means, no air or fumes may pass into the housing 4 without first passing down through the fluid and around the plunger 32, a condition which under ordinary uses of the scale will not be encountered.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a housing having an opening therein, an annular liquid receptacle supported by the housing and surrounding said opening; weighing mechanism supported in said housing and having a link passing through said opening, and through the one in the receptacle; an inverted cup-shaped shield secured to said link and projecting into the liquid in the receptacle to form a fluid sealing means for said opening, and means including a flange on said shield adapted to operate in the liquid to dampen the oscillations of the weighing mechanism.

2. In a weighing scale, in combination, a weighing mechanism, a dash pot having an opening through its bottom and an upright wall surrounding said opening, a liquid in the space in the dash pot surrounding said wall and an inverted cup-shaped plunger operatively connected to the weighing mechanism and adapted to operate in the liquid in the dash pot, the plunger having means whereby the resistance to its movement in the liquid is augmented, said plunger extending over said opening and forming with said liquid a complete closure of the opening.

3. In a weighing scale, in combination, a housing having an opening, load-counterbalancing and indicating mechanism enclosed in said housing, an annular dash pot surrounding said opening, and an annular plunger operating in liquid in said dash pot and connected to said load-counterbalancing and indicating mechanism to dampen the oscillations of said mechanism, said plunger having a cup-like portion extending over said opening and with the fluid forming a sealing device therefor.

4. In a weighing scale, in combination, a housing having an opening, load-counterbalancing and indicating mechanism enclosed in said housing, an annular dash pot surrounding said opening, an annular plunger operating in liquid in said dash pot and connected to said load-counterbalancing and indicating mechanism to dampen the oscillations of said mechanism, said plunger having a cup-like portion extending over said opening and with the fluid forming a sealing device therefor, and means in said dash pot for regulating the damping action of said liquid and plunger.

5. In a weighing scale, in combination, a housing having an opening, weighing mechanism enclosed in said housing, a dash pot having a plunger operating in a fluid in said dash pot and swivelly connected to the weighing mechanism, said plunger being constructed and arranged to dampen or retard the oscillations of the weighing mechanism said plunger extending over said opening and thereby acting to form a sealing means for the opening in the housing, and means on said plunger to regulate the damping action of the dash pot.

EDWARD F. ULRICH.